United States Patent [19]

Kanda et al.

[11] Patent Number: 5,101,438
[45] Date of Patent: Mar. 31, 1992

[54] METHOD OF DISCRIMINATING DIFFERENT KINDS OF IMAGE AREAS, INVOLVING TWO-DIMENSIONAL ORTHOGONAL TRANSFORMS

[75] Inventors: Yoshimichi Kanda, Yokohama; Hajime Ichimura, Ichikawa; Hitoshi Ishii, Yokohama, all of Japan

[73] Assignee: Ricoh Company, Ltd., Japan

[21] Appl. No.: 645,915

[22] Filed: Jan. 24, 1991

[30] Foreign Application Priority Data

| Feb. 2, 1990 [JP] | Japan | 2-22144 |
| Jun. 18, 1990 [JP] | Japan | 2-159529 |
| Dec. 20, 1990 [JP] | Japan | 2-411795 |

[51] Int. Cl.⁵ .............................. G06K 9/34
[52] U.S. Cl. .............................. 382/9; 382/50; 358/432; 358/462
[58] Field of Search ............ 382/9, 18, 43, 50, 51; 358/432, 456, 460, 462, 432

[56] References Cited

U.S. PATENT DOCUMENTS

| 4,293,920 | 10/1981 | Merola | 358/432 |
| 4,403,257 | 9/1983 | Hsieh | 358/460 |
| 4,447,830 | 5/1984 | Stoffel | 382/50 |
| 4,504,860 | 3/1985 | Nicol et al. | 358/432 |
| 4,741,046 | 4/1988 | Matsunawa et al. | 382/9 |

Primary Examiner—David K. Moore
Assistant Examiner—Jose L. Couso
Attorney, Agent, or Firm—Mason, Fenwick & Lawrence

[57] ABSTRACT

An image area discriminating method surely distinguishes a character image area and a halftone image area printed on a single document in response to image data outputted by an image reader. An image of interest is divided into N×N blocks and subjected to two-dimensional orthogonal transform block by block to produce an N×N coefficient pattern. The blocks each is compared with coefficient patterns prepared beforehand and matching the characteristics of character images to see if the block lies in a character-image area or in a halftone image area. The N×N coefficients may be replaced with N×N vectors. Then, a necessary number of vectors are selected out of the N×N vectors to generate a v-dimensional coefficient vector, and it is compared with vecotrs prepared beforehand for character identification and matching the characteristics of character images.

8 Claims, 9 Drawing Sheets

| j \ i | 1 | 2 | 3 | 4 | 5 | 6 | 7 | 8 |
|---|---|---|---|---|---|---|---|---|
| 1 | 4 | 53 | 52 | 96 | 68 | 34 | 91 | 80 |
| 2 | 3 | 37 | 73 | 95 | 47 | 57 | 102 | 58 |
| 3 | 7 | 50 | 94 | 78 | 39 | 75 | 100 | 43 |
| 4 | 0 | 73 | 100 | 49 | 52 | 99 | 77 | 33 |
| 5 | 4 | 95 | 85 | 39 | 69 | 102 | 56 | 41 |
| 6 | 3 | 105 | 65 | 40 | 90 | 87 | 34 | 64 |
| 7 | 3 | 102 | 47 | 54 | 99 | 67 | 38 | 78 |
| 8 | 7 | 82 | 39 | 77 | 95 | 43 | 53 | 95 |

Fig. 3B

| j \ i | 1 | 2 | 3 | 4 | 5 | 6 | 7 | 8 |
|---|---|---|---|---|---|---|---|---|
| 1 | 3.4 | 20.2 | -0.3 | 16.1 | -13.4 | -4.1 | -5.7 | 2.6 |
| 2 | 6.1 | -23.0 | -7.5 | -23.8 | -21.2 | 106.8 | 1.0 | -9.1 |
| 3 | -1.2 | 3.3 | 43.7 | -4.2 | 111.4 | 27.0 | -37.8 | 2.9 |
| 4 | -1.5 | -11.2 | 4.3 | -13.2 | 10.6 | -48.0 | -3.8 | 0.0 |
| 5 | 2.4 | -1.4 | 3.5 | 0.8 | 2.1 | -2.8 | -2.9 | -4.0 |
| 6 | 0.1 | 3.3 | -0.1 | 0.8 | -2.6 | -13.6 | -2.1 | 2.8 |
| 7 | -0.9 | -1.2 | 4.4 | -4.9 | 6.0 | -0.3 | -1.7 | -1.8 |
| 8 | 0.7 | -0.3 | 0.9 | -0.9 | -1.6 | -1.0 | -4.6 | -1.1 |

Fig. 4A

| j= \ i= | 1 | 2 | 3 | 4 | 5 | 6 | 7 | 8 |
|---|---|---|---|---|---|---|---|---|
| 1 | 10 | 10 | 10 | 10 | 200 | 200 | 200 | 200 |
| 2 | 10 | 10 | 10 | 10 | 200 | 200 | 200 | 200 |
| 3 | 10 | 10 | 10 | 10 | 200 | 200 | 200 | 200 |
| 4 | 10 | 10 | 10 | 10 | 200 | 200 | 200 | 200 |
| 5 | 10 | 10 | 10 | 10 | 200 | 200 | 200 | 200 |
| 6 | 10 | 10 | 10 | 10 | 200 | 200 | 200 | 200 |
| 7 | 10 | 10 | 10 | 10 | 200 | 200 | 200 | 200 |
| 8 | 10 | 10 | 10 | 10 | 200 | 200 | 200 | 200 |

Fig. 4B

| j= \ i= | 1 | 2 | 3 | 4 | 5 | 6 | 7 | 8 |
|---|---|---|---|---|---|---|---|---|
| 1 | 840.0 | -688.7 | 0.0 | 241.8 | 0.0 | -161.6 | 0.0 | 137.0 |
| 2 | 0.0 | 0.0 | 0.0 | 0.0 | 0.0 | 0.0 | 0.0 | 0.0 |
| 3 | 0.0 | 0.0 | 0.0 | 0.0 | 0.0 | 0.0 | 0.0 | 0.0 |
| 4 | 0.0 | 0.0 | 0.0 | 0.0 | 0.0 | 0.0 | 0.0 | 0.0 |
| 5 | 0.0 | 0.0 | 0.0 | 0.0 | 0.0 | 0.0 | 0.0 | 0.0 |
| 6 | 0.0 | 0.0 | 0.0 | 0.0 | 0.0 | 0.0 | 0.0 | 0.0 |
| 7 | 0.0 | 0.0 | 0.0 | 0.0 | 0.0 | 0.0 | 0.0 | 0.0 |
| 8 | 0.0 | 0.0 | 0.0 | 0.0 | 0.0 | 0.0 | 0.0 | 0.0 |

Fig. 5A

| j\i | 1 | 2 | 3 | 4 | 5 | 6 | 7 | 8 |
|---|---|---|---|---|---|---|---|---|
| 1 | 10 | 10 | 10 | 10 | 10 | 10 | 10 | 10 |
| 2 | 10 | 10 | 10 | 10 | 10 | 10 | 10 | 10 |
| 3 | 10 | 10 | 10 | 10 | 10 | 10 | 10 | 10 |
| 4 | 10 | 10 | 10 | 10 | 10 | 10 | 10 | 10 |
| 5 | 200 | 200 | 200 | 200 | 200 | 200 | 200 | 200 |
| 6 | 200 | 200 | 200 | 200 | 200 | 200 | 200 | 200 |
| 7 | 200 | 200 | 200 | 200 | 200 | 200 | 200 | 200 |
| 8 | 200 | 200 | 200 | 200 | 200 | 200 | 200 | 200 |

Fig. 5B

| j\i | 1 | 2 | 3 | 4 | 5 | 6 | 7 | 8 |
|---|---|---|---|---|---|---|---|---|
| 1 | 840.0 | 0.0 | 0.0 | 0.0 | 0.0 | 0.0 | 0.0 | 0.0 |
| 2 | -688.7 | 0.0 | 0.0 | 0.0 | 0.0 | 0.0 | 0.0 | 0.0 |
| 3 | 0.0 | 0.0 | 0.0 | 0.0 | 0.0 | 0.0 | 0.0 | 0.0 |
| 4 | 241.8 | 0.0 | 0.0 | 0.0 | 0.0 | 0.0 | 0.0 | 0.0 |
| 5 | 0.0 | 0.0 | 0.0 | 0.0 | 0.0 | 0.0 | 0.0 | 0.0 |
| 6 | -161.6 | 0.0 | 0.0 | 0.0 | 0.0 | 0.0 | 0.0 | 0.0 |
| 7 | 0.0 | 0.0 | 0.0 | 0.0 | 0.0 | 0.0 | 0.0 | 0.0 |
| 8 | 137.0 | 0.0 | 0.0 | 0.0 | 0.0 | 0.0 | 0.0 | 0.0 |

METHOD OF DISCRIMINATING DIFFERENT KINDS OF IMAGE AREAS, INVOLVING TWO-DIMENSIONAL ORTHOGONAL TRANSFORMS

BACKGROUND OF THE INVENTION

The present invention relates to a method of binarizing image data representative of a document image read by an image reader in a manner optimal for the characteristic of the image. More particularly, the present invention is concerned with a method of determining the image characteristic of image data to be processed.

Reading a document by a scanner or similar image reader and reproducing the resultant digital image data by a two-level output type printer is a common practice in the imaging art. A prerequisite with such a procedure is that halftone image areas and character image areas included in the digial image data be separated from each other, and each be binarized in a particular manner. To meet this prerequisite, means for distinguishing the halftone image areas and character image areas is indispensable. Japanese Patent Laid-Open Publication (Kokai) No. 146067/1986, for example, discloses a method which applies orthogonal transform to a given image area to determine the frequency components contained therein. This method is derived from the fact that high-frequency components and low-frequency components are predominant in character image areas and halftone image areas, respectively. Specifically, the kind of an image area is determined in terms of the power of high-frequency components. However, the decision by such a method which relies on the power of high-frequency components is not accurate. For example, when a portion containing high-frequency components exists in a halftone image area, the above-mentioned method would erroneously regard the halftone image area as a character image area.

SUMMARY OF THE INVENTION

It is therefore an object of the present invention to provide a method capable of accurately distinguishing halftone image areas and character image areas existing together on a single document on the basis of image data produced by an image reader.

In accordance with the present invention, in image processing for selectively applying either one of plain binary processing suitable for character images and binary processing for rendering quasi-halftone suitable for halftone images to digital image data which is developed by quantizing, with respect to multiple levels, image data representative of a document having a character image area and a halftone image area and read by an image reader, a method of discriminating the character image area and the halftone image area in response to the digital image data comprises the steps of dividing digital image data of interest into $N \times N$ blocks, executing two-dimensional orthogonal transform on each of the blocks, producing an $N \times N$ coefficient pattern, comparing the coefficient pattern with a predetermined number of coefficient patterns prepared beforehand and matching the characteristics of character images, and determining whether the blocks each lies in a character image area or in a halftone image area.

Also, in accordance with the present invention, in processing of the kind described, a method of discriminating the character image area and the halftone image area in response to the digital image data comprises the steps of dividing digital image data of interest into $N \times N$ blocks, executing two-dimensional orthogonal transform on each of the blocks, producing $N \times N$ coefficients, selecting $v$ coefficients out of the $N \times N$ coefficients to generate a $v$-dimensional vector, comparing the $v$-dimensional vector with a plurality of $v$-dimensional vectors for character identification and matching characteristics of character images, and determining whether the blocks each lies a character image area or in a halftone image area on the basis of a result of comparison.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Preferred embodiments of the present invention will be described in detail with reference to the accompanying drawings.

First Embodiment

Figure 1:
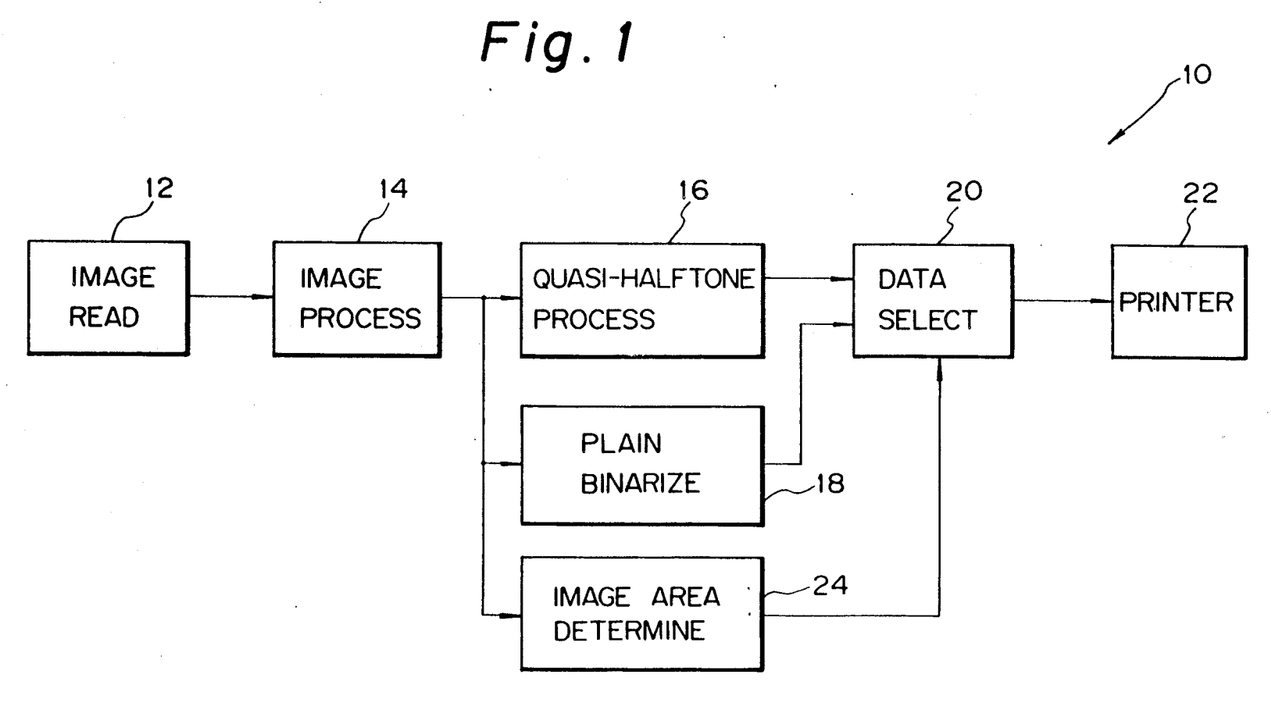
FIG. 1 is a block diagram schematically showing a digital copier to which the present invention is applicable.

Referring to FIG. 1, a digital copier with which illustrative embodiments of the present invention are practicable is shown and generally designated by the reference numeral 10. As shown, the copier 10 has an image reading section or scanner 12 which includes optics, CCD line sensor and video amplifier and sequentialy reads a document image by decomposing it into pixels in the main and subscanning directions. The image reading section 12 is connected to an image processing section 14 which subjects the resulted image data to black-white conversion and analog-to-digital conversion for quantization and, if necessary, shading correction, MTF correction, and background removal. The image processing section 14 is connected to a quasi-halftone processing section 16 and a plain binary processing section 18. The quasi-halftone processing section 16 executes binarization suitable for halftone images while covering halftone derived from the conventional dither method, density pattern method and submatrix method. The plain binarizing section 18 effects simple binarization suitable for character images included in digital image data. A data selecting section 20 selects either one of the binary data from the quasi-halftone processing section 16 and the binary data from the plain binarizing section 18 and feeds it to a printer 22. An image area discriminating section 24 is connected between the image processing section 14 and the data selecting section 20 for distinguishing different kinds of image areas on the basis of the image data and thereby outputting a switching signal. Specifically, this section 24 determines whether digital image data to be binarized is representative of a halftone image area or a character image area by referencing the digital image data processed by the image processing section 14. In this embodiment, the discriminating section 24 reads $N \times N$ blocks of digital image data from the image processing section 14 at a time, executes two-dimensional orthogonal transform with each of the blocks to produce $N \times N$ coefficient patterns, and compares each coefficient pattern with coefficient patterns prepared beforehand and matching the characteristic of character images. As a result, whether the block of interest lies in a character image area or in a halftone image area is determined.

Figure 2:
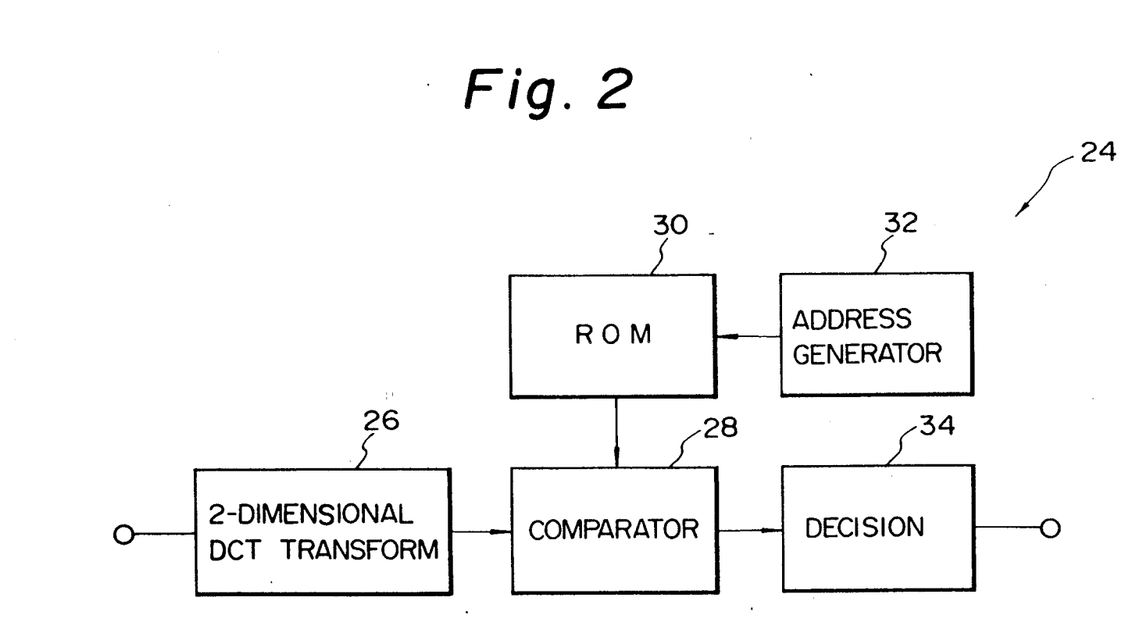
FIG. 2 is a block diagram schematically showing a specific construction of an image area discriminating section shown in FIG. 1.

FIG. 2 shows a specific construction of the image area discriminating section 24 in which DCT (Discrete Cosine Transform) is used as orthogonal transform. As shown, the discriminating section 24 has a two-dimensional DCT transform 26 which produces a DCT coefficient pattern associated with $N \times N$ image blocks. An $N \times N$ two-dimensional DCT transform function $Y_{uv}$ for a signal $X_{ij}$ is expressed as:

$$Y_{uv} = \frac{2 \cdot C(u) \cdot C(v)}{N} \sum_{i=0}^{N-1} \sum_{j=0}^{N-1} X_{ij} \cdot \cos\left(\frac{(2i+1)u\pi}{2 \cdot N}\right) \cdot \cos\left(\frac{(2j+1)u\pi}{2 \cdot N}\right) \quad \text{Eq. (1)}$$

where
$u = 0, 1, 2, \ldots, N - 1,$
$v = 0, 1, 2, \ldots, N - 1,$
$C(w) = 1/\sqrt{2} \ (w = 0),$
and
$C(w) = 1 \ (w = 1, 2, 3, \ldots, N).$ The DCT coefficient pattern is fed to a comparator 28 to be compared with DCT coefficient patterns stored in a ROM 30 beforehand and matching the characteristic of character images. Specifically, as an address generator 32 delivers an address to the ROM 30, the ROM 30 outputs a particular DCT coefficient pattern. The comparator 28 produces a difference d between the DCT coefficient pattern outputted by the ROM 30 and the DCT coefficient pattern fed from the DCT transform 26. Assuming that the input $N \times N$ coefficient pattern is X, and one of the DCT coefficient patterns stored beforehand in the ROM 30 is Y, then the coefficient patterns X and Y and the difference d are produced by:

$$X = \{X_{11}, X_{12}, X_{13}, \ldots, X_{NN-1}, X_{NN}\} \quad \text{Eq. (2)}$$

$$Y = \{Y_{11}, Y_{12}, Y_{13}, \ldots, Y_{NN-1}, Y_{NN}\} \quad \text{Eq. (3)}$$

$$d = \sum_{i=1}^{N} \sum_{j=1}^{N} |X_{ij} - Y_{ij}|$$

or $$d = \sum_{i=1}^{N} \sum_{j=1}^{N} (X_{ij} - Y_{ij})^2 \quad \text{Eq. (4)}$$

The difference d is determined with all of the DCT coefficient patterns stored in the ROM 30. On receiving such difference d, a decision 34 determines that the image area of interest is a character area if the sum of the differences is smaller than a threshold or that it is a halftone area if otherwise.

Figure 3A:
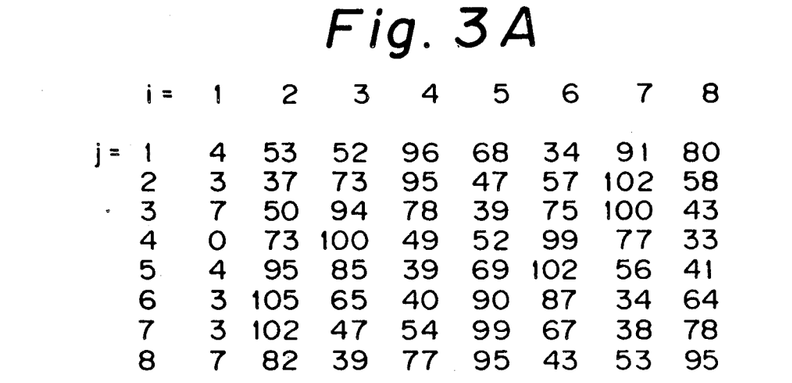
FIGS. 3A, 3B, 4A, 4B, 5A and 5B are matrixes indicating how a character image and a halftone image are discriminated from each other.
Figure 3B:
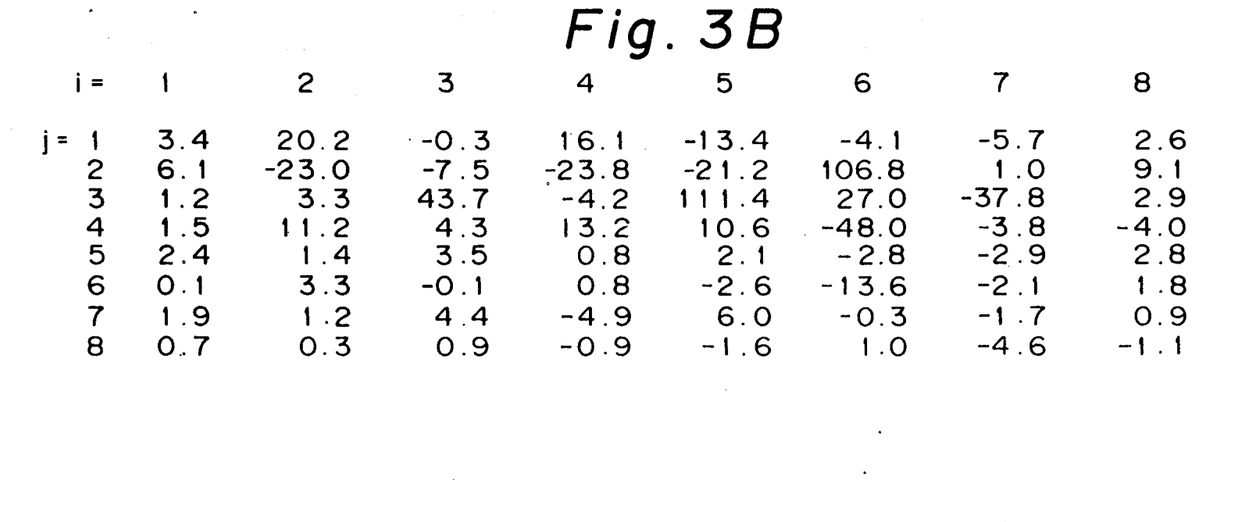
Figure 4A:
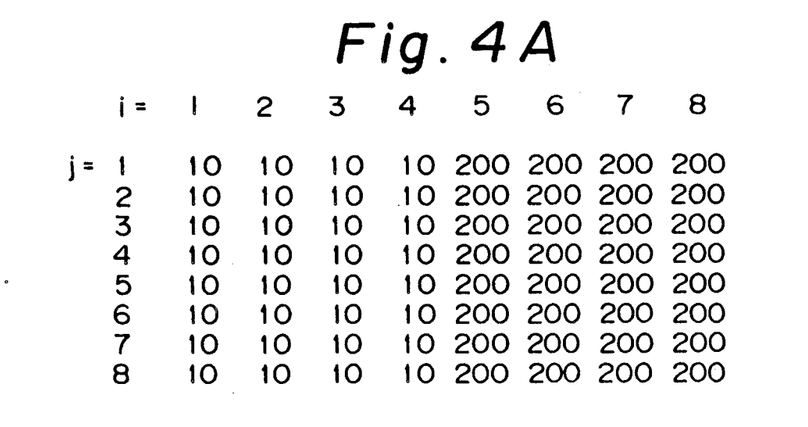
Figure 4B:
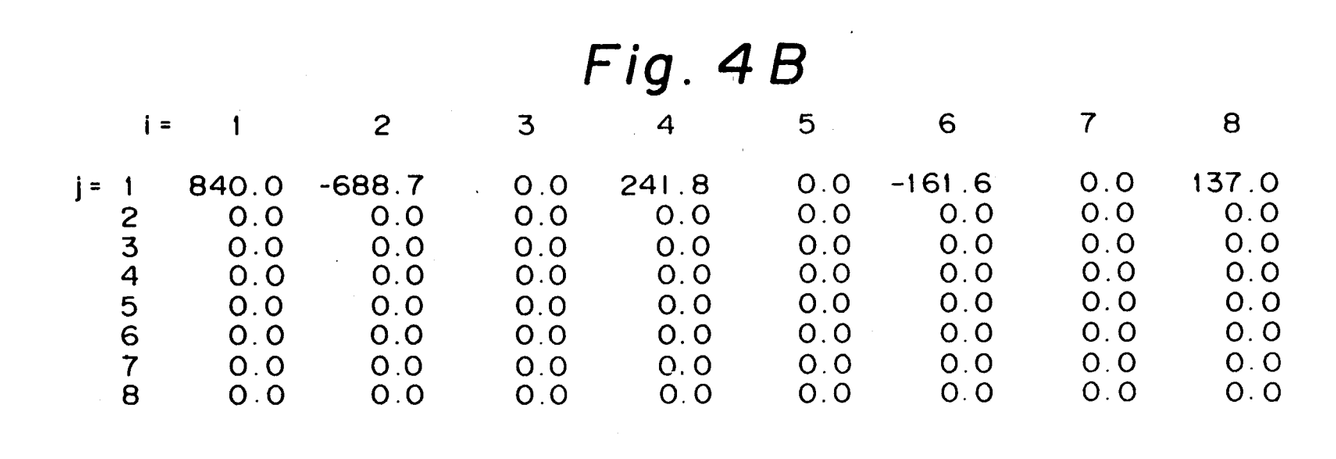
Figure 5A:
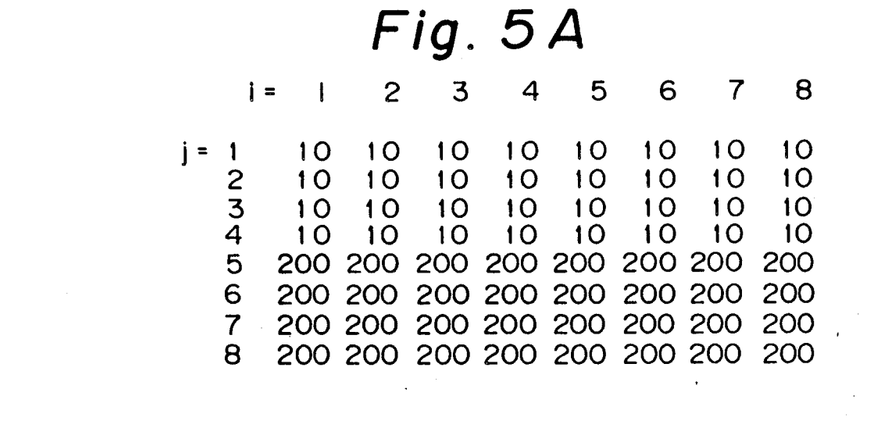
Figure 5B:
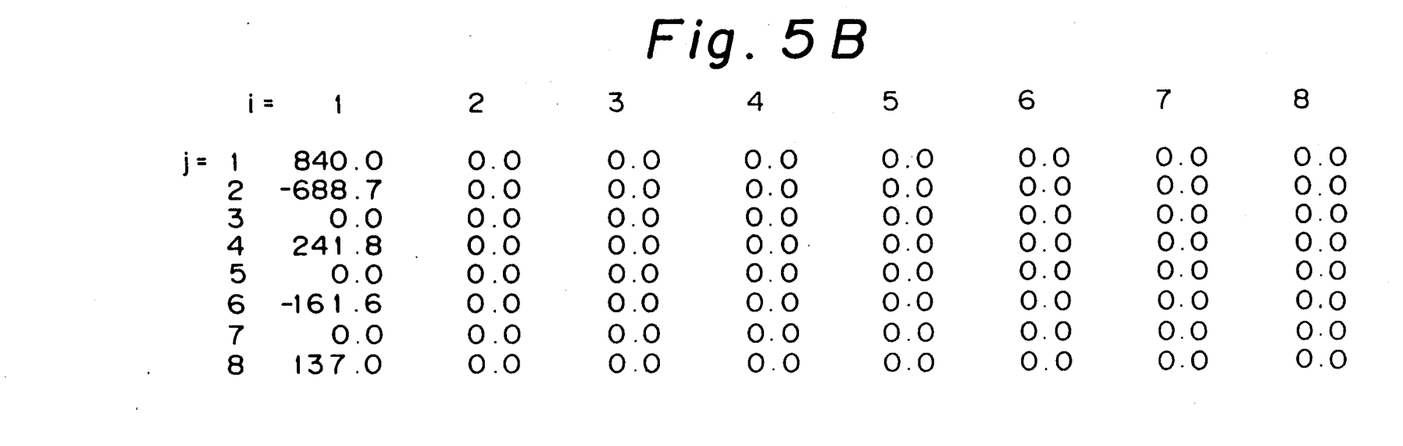

Generally, a halftone image and a character image each shows a particular tendency with respect to DCT coefficients when subjected to two-dimensional DCT transform. Regarding a halftone area, for example, the density slowly changes, as shown in FIG. 3A specifically. FIG. 3B shows coefficients produced by the DCT transform of the specific densities shown in FIG. 3A. On the other hand, assume that a character image has a vertically changing edge portion as shown in FIG. 4A and a horizontally changing edge portion as shown in FIG. 5A and is subjected to DCT transform. Then, among the DCT coefficients derived from the vertically changing edge portion, only the coefficients $j=1$ have values, as shown in FIG. 4B. Likewise, among the DCT coefficients derived from the horizontally changing edge portion, only the coefficients $i=1$ have values, as shown in FIG. 5B. In this respect, the DCT coefficients of a character image are clearly distinguishable in tendency over the DCT coefficients of a halftone image. Hence, DCT coefficients of a halftone image are more different from the DCT coefficient pattern matching the characteristic of character images than the DCT coefficients of a character image. This is why the above-stated decision principle is practical.

The DCT coefficient patterns stored in the ROM 30 will be described specifically. It is desirable that the characteristics of coefficient patterns of character images be covered by a minimum number of coefficient patterns to be stored in the ROM 30. For this reason, the DCT coefficient patterns are generated by vector quantization which belongs to a family of highly efficient coding methods available with digital images. Vector quantization includes the steps of combining K signals to produce a K-dimensional input vector $X = \{X_1, X_2, X_3, \ldots, X_{k-1}, X_k\}$, selecting one of C regenerating vectors $Y_i = \{Y_{i1}, Y_{i2}, Y_{i3}, Y_{ik-1}, Y_{ik}\}$ (where $i = 1, \ldots, C$) prepared beforehand, mapping the input vector X on the regenerating vector $Y_i$, and sending the index of the regenerated vector. LBG algorithm is a typical approach available for designing the regenerating vectors and allows, among a great number of vectors, C regenerating vectors to be designed which have typical characteristics of the group of vectors. The C DCT coefficient patterns to be stored in the ROM 30 are designed by using such LBG algorithm.

Figure 6:
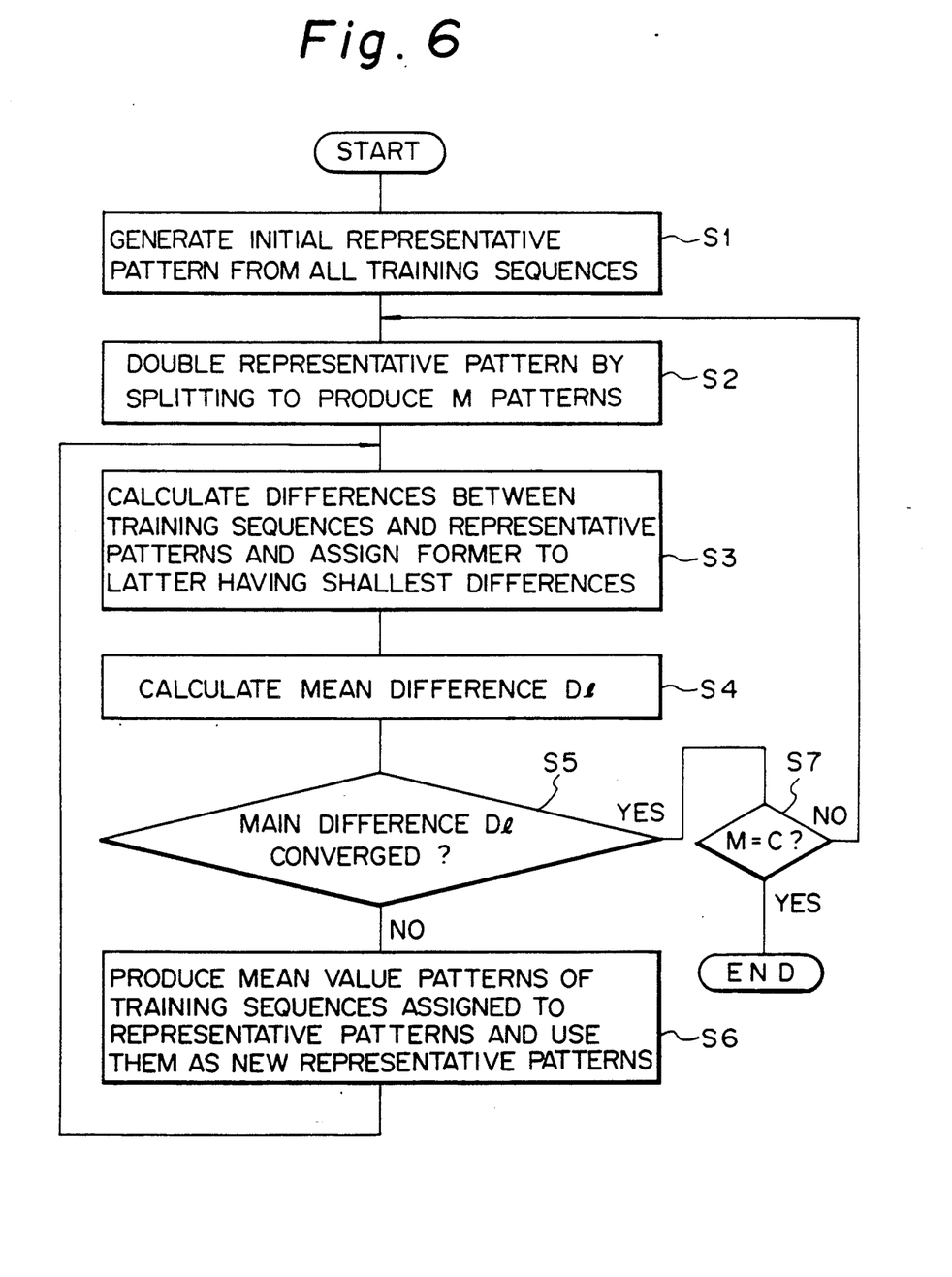
FIG. 6 is a flowchart demonstrating a specific procedure for generating a DCT (Discrete Cosine Transform) coefficient pattern and representative of a first embodiment of the present invention.

FIG. 6 shows a specific procedure for designing the C DCT coefficient patterns as stated above. To begin with, several independent character images each is divided into $N \times N$ blocks and subjected to two-dimensional DCT transform block by block to prepare a number of DCT coefficient patterns. This group of DCT coefficient patterns will be referred to as trailing sequences hereinafter. Then, an initial representative pattern having the means values of the individual elements of the training sequences is generated (step S1). Subsequently, the initial representative pattern is doubled in number by a method known as splitting (S2). According to the splitting method, a pattern δ having an extremely small value (e.g. 0.001) in all of the elements thereof is prepared. Assuming that the k-th representative pattern is $Y_k = \{Y_{11}, Y_{12}, Y_{13}, \ldots, Y_{NN-1}, Y_{NN}\}$, the representative pattern is doubled in number by the following equations:

$$Y_k = Y_k' + \delta \qquad \text{Eq. (5)}$$

$$Y_{k+M/2} = Y_k - \delta \qquad \text{Eq. (6)}$$

where M is the doubled number of representative patterns.

Subsequently, the differences between all of the training sequences and all of the representative patterns are calculated, and each training sequence is assigned to a particular representative pattern having the smallest difference (S3). Assuming that a given training sequence is $X = \{X_{11}, X_{12}, X_{13}, \ldots, X_{NN-1}, X_{NN}\}$, then the difference d is produced by $$d = \sum_{i=1}^{N} \sum_{j=1}^{N} |X_{ij} - Y_{ij}^k|$$

or $$d = \sum_{i=1}^{N} \sum_{j=1}^{N} (X_{ij} - Y_{ij}^k)^2$$

A mean difference $D_l$ is calculated by averaging the differences between the individual training sequences and the associated representative patterns having the smallest differences (S4). Then, whether or not the mean difference $D_l$ has converged is determined (S5). If a value of $(D_{l-1} - D_l)$ (l being the number of times that splitting is effected) is not smaller than a threshold value, a pattern of mean values is again determined with each of the training sequences assigned to the representative patterns, and such patterns are used as new representative patterns (S6). Thereafter, the program returns to the step S3. Such a procedure is repeated until the mean difference $D_l$ coverges. Here, $D_o$ is equal to $-\infty$. When the mean difference $D_l$ converges, the representative pattern of that instant is determined to be a representative pattern. This sequence of steps is repeated until C representative patterns have been obtained.

By the procedure described above, C DCT coefficient patterns covering the characteristics of DCT coefficient patterns of character images and to be stored in the ROM 30, FIG. 2, are generated. Character areas and halftone areas can, therefore, be distinguished from each other with accuracy.

Second Embodiment

An alternative embodiment which will be described is essentially similar to the previous embodiment except for some differences. Specifically, in this embodiment, the difference d of a coefficient pattern is applied to the area discriminating section 34, FIG. 2. If the difference d is smaller than a predetermined threshold, the area of interest is determined to be a character area. This operation is effected with the individual DCT coefficient patterns stored in the ROM 30. As soon as the difference d becomes smaller than the threshold, the operation is stopped and the area of interest is determined to be a character area. If the difference d remains greater than the threshold up to the last DCT coefficient pattern, the area is determined to be a halftone area. This is followed by the same sequence of steps as in the first embodiment. The threshold may be selected by experiments.

As described above, the first and second embodiments each divides an image to be processed into N×N blocks, subjects the image to two-dimensional orthogonal transform block by block to produce an N×N coefficient pattern, and compares the coefficient pattern with coefficient patterns prepared beforehand and matchin the characteristics of character images. Hence, whether each block lies in a character area or in a halftone area can be determined with a minimum of erroneous decision.

THIRD EMBODIMENT

Figure 9:
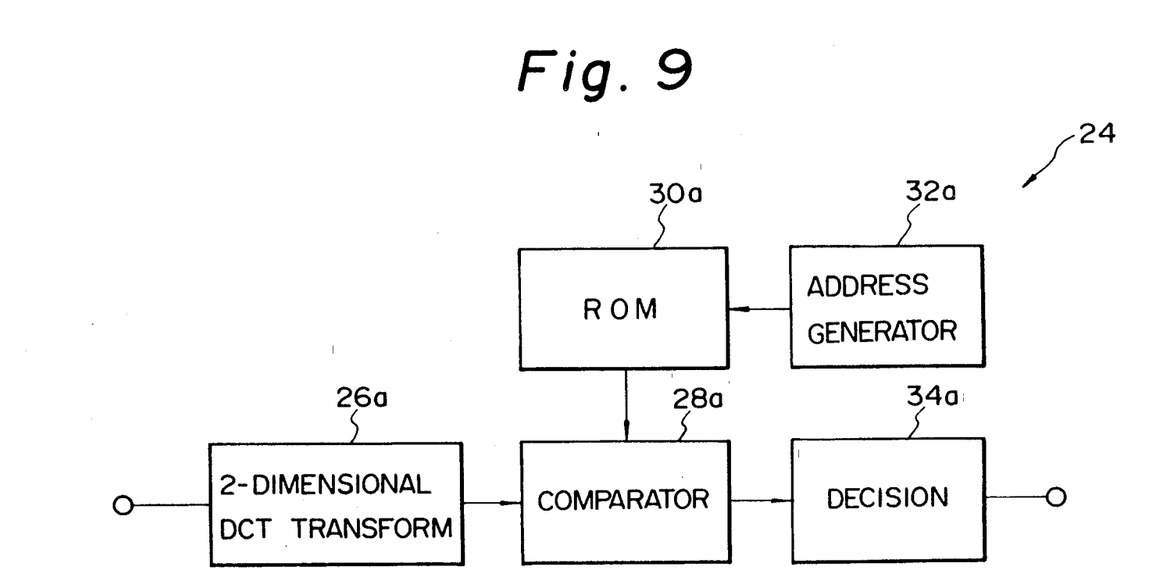
FIG. 9 is a block diagram schematically showing an image area discriminating section representative of a third embodiment of the present invention.

In this embodiment, the image area discriminating section 24 reads digital image data from the image processing section 14 on an N×N block basis. Each of these N×N blocks is subjected to two-dimensional orthogonal transform to produce N×N coefficients, and v low-order coefficients other than (0,0) are selected out of the N×N coefficients to prepare a v-dimensional vector. The v-dimensional vector is compared with v-dimensional vectors prepared beforehand and matching the characteristics of character images so as to see if the block of interest lies in a character area or in a halftone area.

The characteristics of transform coefficients produced by the two-dimensional orthogonal transform of each of N×N blocks will be described. Again, the orthogonal transform is implemented by the DCT transform. An N×N two-dimensional DCT transform function $Y_{uv}$ for a signal $X_{ij}$ is as follows:

$$Y_{uv} = \frac{4 \cdot C(u) \cdot C(v)}{N^2} \sum_{i=0}^{N-1} \sum_{j=0}^{N-1} X_{ij} \cdot \qquad \text{Eq. (7)}$$

$$\cos\left(\frac{(2i+1)u\pi}{2 \cdot N}\right) \cdot \cos\left(\frac{(2j+1)v\pi}{2 \cdot N}\right)$$

where
$u = 0, 1, 2, \ldots, N-1$,
$v = 0, 1, 2, \ldots, N-1$, $C(w) = 1/\sqrt{2} \ (w = 0)$,
and
$C(w) = 1 \ (w = 1, 2, 3, \ldots, N-1)$.

Assuming that N is "8" for illustration, the Eq. (7) is rewritten as:

$$Y_{uv} = \frac{4 \cdot C(u) \cdot C(v)}{8^2} \sum_{i=0}^{7} \sum_{j=0}^{7} X_{ij} \cdot \qquad \text{Eq. (8)}$$

$$\cos\left(\frac{(2i+1)u\pi}{2 \times 8}\right) \cdot \cos\left(\frac{(2j+1)v\pi}{2 \times 8}\right)$$

Figure 7:
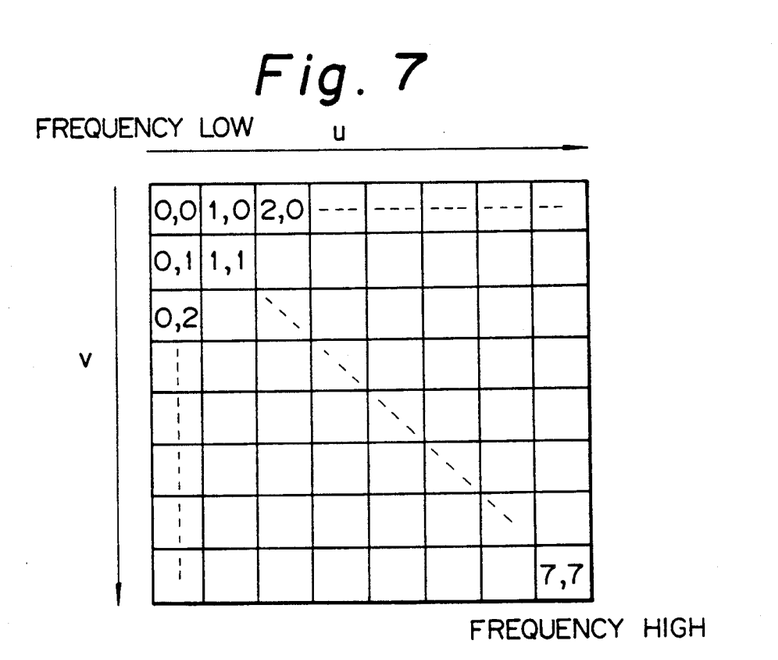
FIG. 7 shows a distribution characteristic particular to DCT coefficients.

FIG. 7 shows 8×8 DCT coefficients produced by the above operation. Among the coefficients shown in FIG. 7, the coefficient (0,0) is called a DC component and has a value corresponding to the mean luminance of the block of interest, while the other coefficients are called AC components and are representative of the ratios of frequency components contained in the block. The higher the order of the AC component, the greater the ratio of high-frequency components is. While an edge portion is predominant in character images, the tone slowly changes in major part of a halftone image. It follows that the comparison of the two different kinds of images can be done if use is made of the AC components, i.e., the DC component is not necessary.

Figure 8:
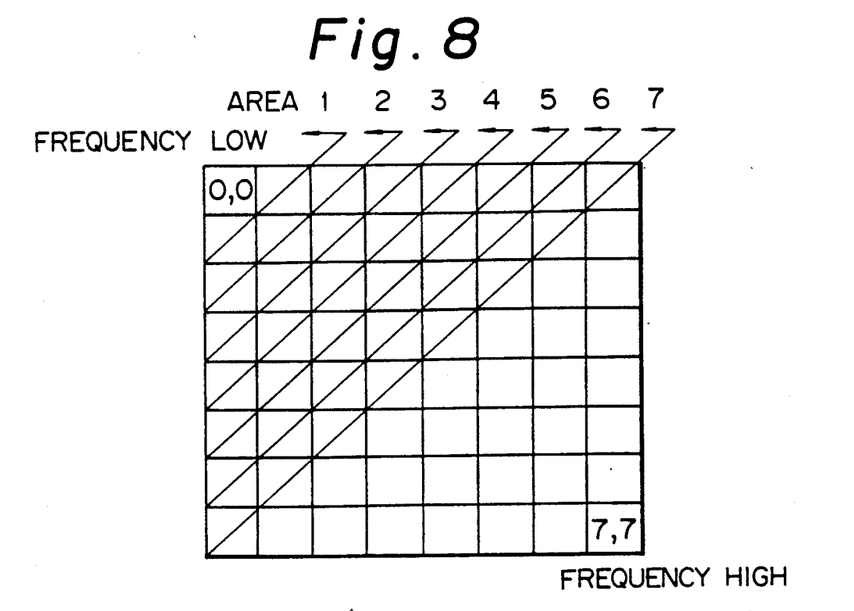
FIG. 8 shows a dispersion characteristic particular to AC components in the entire image.

Regarding the dispersion of the AC components in the entire image, there is a tendency that low-order coefficients are more dispersed than high-order coefficients in both of character images and halftone images. As shown in FIG. 8, when the coefficients are divided by zones and the ratio of the sum of the dispersions contained in each zone to the sum of the dispersions of the entire AC components is determined, it is usually in the zone 7 that the ratio exceeds 90%. Hence, comparing a character and halftone by observing the zones 1 to 7 only is satisfactory. It is to be noted that each zone shown in FIG. 8 includes the border line and is located on the side indicated by an arrow in the figure. In the illustrative embodiment, therefore, AC components lying in the zones 1 to 7 are selected out of the 8×8 DCT coefficients to generate a 31-dimensional vector. This 31-dimensional vector is compared with 31-dimensional vectors prepared beforehand and matching the characteristics of character images and is thereby determined to lie in a character area or in a halftone area.

FIG. 9 shows a specific construction of the image area discriminating section 24 for practicing this embodiment. As shown, the discriminating section 24 has a two-dimensional DCT transform 26a for effecting two-dimensional DCT transform with each of 8×8 blocks of digital image data which are fed from the image processing section 14, FIG. 1, whereby 8×8 DCT coefficients are produced. A ROM 30a stores 31-dimensional vectors matching the characteristics of character images and adapted for the identification of characters. An address generator 32a is connected to the ROM 30a. A comparator 28a is connected to the DCT transform 26a and ROM 30a. When the address generator 32a delivers an address to the ROM 30a, the ROM 30a feeds a particular vector to the comparator 28a. In response, the comparator 28 determines a difference d between the 31-dimensional vector to be compared and the vector from the ROM 30a. Assuming that the 31-dimensional vector selected from the 8×8 coefficients of interest is X, and that one of the vectors prepared beforehand is Y, the vectors X and Y and the difference are produced by:

$$X = \{X_0, X_1, X_2, \ldots, X_{29}, X_{30}\} \quad \text{Eq. (9)}$$

$$Y = \{Y_0, Y_1, Y_2, \ldots, Y_{29}, Y_{30}\} \quad \text{Eq. (10)}$$

$$d = \sum_{i=0}^{30} |X_i - Y_i|$$

or $$d = \sum_{i=0}^{30} (X_i - Y_i)^2 \quad \text{Eq. (11)}$$

The use of 31 coefficients in place of 8×8 coefficients as stated above is successful in reducing the calculating time by more than half. The difference d is calculated with all of the vectors stored in the ROM 30 and fed to a decision 34a. The decision 34a determines that the area of interest is a character area if the sum of the errors d is smaller than a threshold or that it is a halftone area if otherwise.

The vectors for character identification stored in the ROM 30a will be described specifically. It is desirable that the characteristics of 31-dimensional vectors of character images be covered by a minimum number of vectors to be stored in the ROM 30a. For this reason, the vectors for identifying characters are generated by vector quantization which belongs to a family of highly efficient coding methods available with digital images. Vector quantization includes the steps of combining $v$ signals to produce a $v$-dimensional vector $X = \{X_0, X_1, \ldots, X_{v-1}\}$, selecting one of C regenerating vectors $Y_i = \{Y_{i0}, Y_{i1}, \ldots, Y_{i(v-1)}\}$ (where $i = 0, \ldots, C-1$), mapping the vector X on the regenerating vector Y, and sending the index of the regenerated vector. LBG algorithm is commonly used to design the regenerating vectors and allows, among a great number of vectors, C regenerating vectors to be designed which have typical characteristictypical of the group of vectors. The C vectors to be stored in the ROM 30a are designed by using the LBG algorithm.

Figure 10:
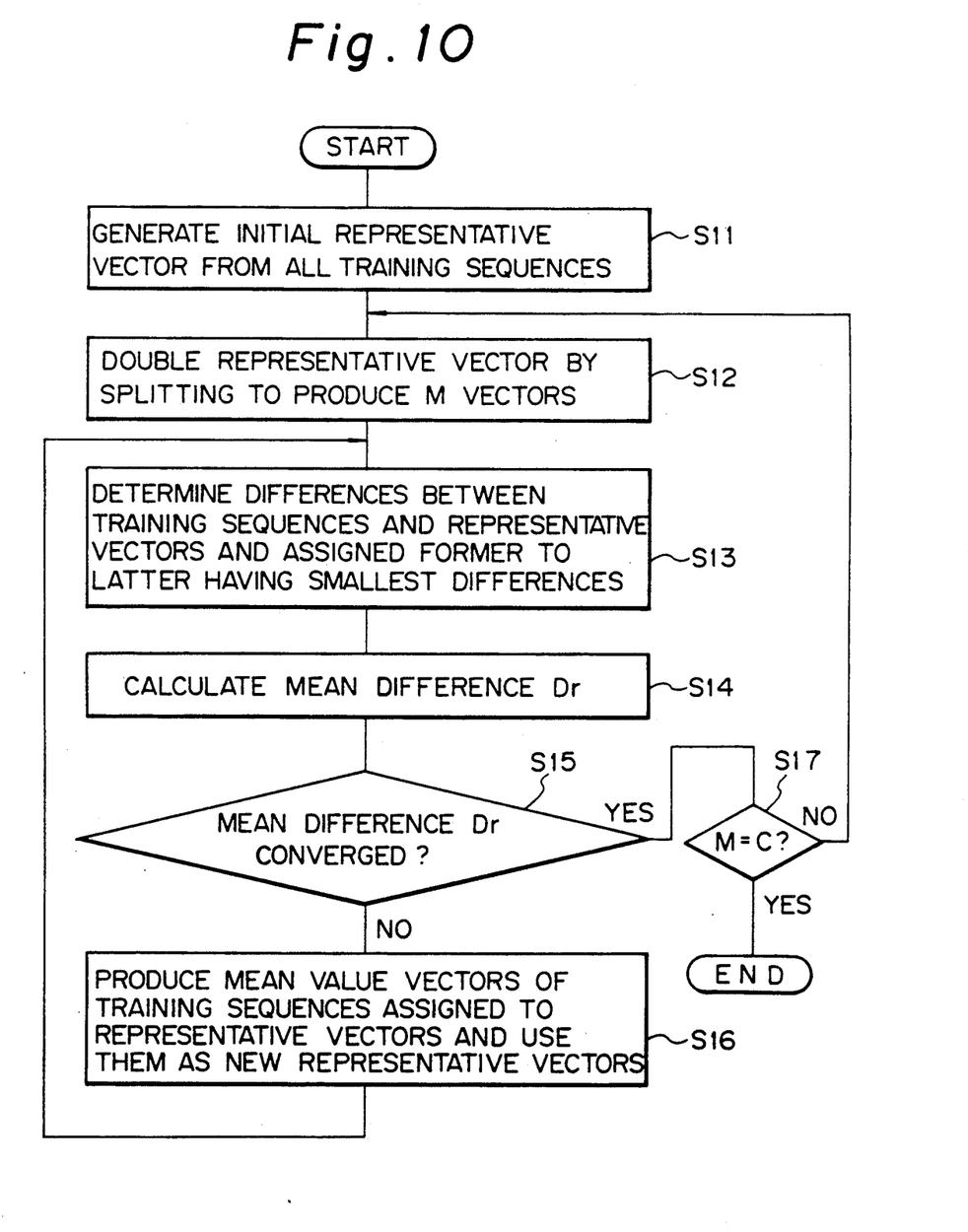
FIG. 10 is a flowchart demonstrating a specific procedure for generating vectors for identifying characters particular to the third embodiment.

A specific processing procedure will be described with reference to FIG. 10. To begin with, several independent character images each is divided into N×N blocks, and each block is subjected to two-dimensional DCT transform to prepare a DCT coefficient pattern. Among the DCT coefficients, $v$ DCT coefficients are selected to generate a $v$-dimensional vector of a number of character images. This group of vectors will be referred to as a training sequence hereinafter. Then, an initial representative vector having the mean value of the individual elements of the training sequence is generated (S11). The initial representative patterns is doubled in number by the splitting method stated perviously splitting (S12). According to the splitting method, a vector $\delta$ having an extremely small value (e.g. 0.001) in all of the elements thereof is prepared. Assuming that the k-th representative vector is $Y_k = \{Y_{k0}, Y_{k1}, \ldots, Y_{k(v-1)}\}$, the representative vector is doubled in number by the following equations:

$$Y_k = Y_k' + \delta \quad \text{Eq. (12)}$$

$$Y_{k+M/2} = Y_k' - \delta \quad \text{Eq. (13)}$$

where M is the doubled number of representative vectors.

Subsequently, the differences between all of the training sequences and all of the representative vectors are calculated, and each training sequence is assigned to a particular representative vector having the smallest differences (S3). Assuming that a given training sequence is $X = \{X_0, X_1, \ldots, X_{v-1}\}$, then the difference d is produced by $$d = \sum_{i=0}^{V-1} |X_i - Y_i|$$

or $$d = \sum_{i=0}^{V-1} (X_i - Y_i)^2$$

A mean difference $D_\gamma$ is calculated by averaging the differences between the individual training sequences and the associated representative vectors having the smallest differences (S14). Then, whether or not the mean difference $D_\gamma$ has converged is determined (S15). If a value of $(D_{\gamma-1} - D_\gamma)/D_\gamma$ ($\gamma$ being the number of times that splitting is effected) is not smaller than a threshold value, a mean vector is again determined with the individual training sequences each being assigned to a particular representative vector, and such vectors are used as new representative patterns (S16). Thereafter, the program returns to the step S13. Such a procedure is repeated until the mean difference $D_\gamma$ converges. Here, $D_{-1}$ is equal to $-\infty$. When the mean difference $D_\gamma$ converges, the representative vector of that instant is determined to be a representative vector. This sequence of steps is repeated until C representative vectors have been obtained.

By the procedure described above, C vectors covering the characteristics of DCT coefficient patterns of character images and to be stored in the ROM 30a are generated. Character areas and halftone areas can, therefore, be distinguished from each other with accuracy.

As described above, the third embodiment divides an image to be processed into N×N blocks, subjects the image to two-dimensional orthogonal transform block by block to produce N×N vectors, selects a necessary number of vectors out of the N×N vectors to generate a v-dimensional coefficient vector, and compares it vectors prepared beforehand and matching the characteristics of character images. Hence, whether each block lies in a character area or in a halftone area can be determined with a minimum of erroneous decision.

Various modifications will become possible for those skilled in the art after receiving the teachings of the present disclosure without departing from the scope thereof.

What is claimed is:

1. In image processing, a method for discriminating between a character image area and a halftone image area in a document that has been read by an image reader to develop, by quantizing with respect to multiple levels, digital image data, said method comprising the steps of:
   (a) dividing the digital image data of interest into N×N blocks;
   (b) subjecting each block to a two-dimensional orthogonal transform to produce N×N coefficients;
   (c) selecting v coefficients out of the N×N coefficients, where v is a number less than the total number of coefficients in the N×N coefficients;
   (d) generating a v-dimensional vector from the selected v coefficients;
   (e) comparing the v-dimensional vector with a predetermined number of pre-existing v-dimensional vectors that have characteristics of character images; and
   (f) determining, from the comparison of the v-dimensional vector with the predetermined number of pre-existing v-dimensional vectors, whether the digital image data comes from the portion of the document that contains character image data or halftone image data.

2. The method of claim 1, wherein said determining step (f) comprises:
   determining the differences between the compared v-dimensional vector and the predetermined number of pre-existing v-dimensional vectors that have characteristics of character images;
   summing the differences; and
   determining how the summed differences relate to a predetermined threshold, said threshold chosen so that if the summed differences are less than the threshold, the block represents character image data, and, if the summed differences are equal to or greater than the threshold, the block represents halftone image data.

3. The method as claimed in claim 2, wherein the v coefficients selected from M×N coefficients are lower order coefficients other than DC components and lying in a predetermined range.

4. The method as claimed in claim 3, wherein a vector of predetermined dimension is generated from said predetermined lower order coefficients and compared with a vector of predetermined dimension suitable for the characteristic of a character image formed beforehand.

5. An image area discriminating apparatus for distinguishing between a character image area and a halftone image area printed on a document that has been read by an image reader to develop digital image data, the apparatus comprising:
   a) means for dividing the digital image data of interest into N×N blocks;
   b) means for subjecting each block to a two-dimensional orthogonal transform to produce N×N coefficients for each block;
   c) means for selecting v coefficients out of the N×N coefficients, where v is a number less than the total number of coefficients in the N×N coefficients;
   d) means for generating a v-dimensional vector from the selected v coefficients;
   e) storage means for storing a predetermined number of v-dimensional vectors that have characteristics of images;
   f) means for comparing the v-dimensional vector with said predetermined number of pre-existing v-dimensional vectors that have characteristics of pre-selected images; and
   g) means for determining, from the comparison of the v-dimensional vector with the predetermined number of pre-existing v-dimensional vectors, whether the digital image data comes from the portion of the document that contains character image data or halftone image data.

6. The apparatus of claim 5, wherein said predetermined number of v-dimensional vectors have characteristics of character images and said determining means comprises:
   first determining means for determining the differences between the compared v-dimensional vector and the predetermined number of pre-existing v-dimensional vectors that have characteristics of character images;
   means for summing the differences; and
   second determining means for determining how the summed differences relate to a predetermined threshold, said threshold chosen so that if the summed differences are less than the threshold, the block of interest represents character image data, and, if the summed differences are equal to or greater than the threshold, the block of interest represents halftone image data.

7. The apparatus as claimed in claim 6, wherein the v coefficients selected from M×N coefficients are lower order coefficients other than DC components and lying in a predetermined range.

8. The apparatus as claimed in claim 7, wherein a vector of predetermined dimension is generated from said predetermined lower order coefficients and compared with a vector of predetermined dimension suitable for the characteristic of a character image formed beforehand.

* * * * *